June 14, 1955 D. ALDERMAN 2,710,499
MEANS FOR GENERATING GEARS
Filed May 26, 1954 5 Sheets-Sheet 1

INVENTOR.
DALE ALDERMAN.
BY Edward M. Apple

June 14, 1955 D. ALDERMAN 2,710,499

MEANS FOR GENERATING GEARS

Filed May 26, 1954 5 Sheets-Sheet 2

INVENTOR.
DALE ALDERMAN.
BY
Edward M. Apple

June 14, 1955 D. ALDERMAN 2,710,499

MEANS FOR GENERATING GEARS

Filed May 26, 1954 5 Sheets-Sheet 3

INVENTOR.
DALE ALDERMAN
BY
Edward M. Apple

June 14, 1955 D. ALDERMAN 2,710,499

MEANS FOR GENERATING GEARS

Filed May 26, 1954 5 Sheets-Sheet 4

INVENTOR.
DALE ALDERMAN

BY

Edward M. Apple

INVENTOR.
DALE ALDERMAN
BY
Edward M. Apple

United States Patent Office 2,710,499
Patented June 14, 1955

2,710,499

MEANS FOR GENERATING GEARS

Dale Alderman, Birmingham, Mich.

Application May 26, 1954, Serial No. 432,357
10 Claims. (Cl. 51—232)

This invention relates to the art of forming gears, and has particular reference to a means primarily for generating spur and helical gears, although gears of other form may be generated with the invention by altering the contour of the grinding wheel or cutting tool, consistent with the gear to be formed.

An object of the invention is to provide a means for generating gears, which employs a novel system of motions, wherein there is a predetermined ratio of linear motion to circular motion, by means of a single block setting for each size of gear to be generated throughout a comparatively wide range of sizes.

Another object of the invention is to provide a comparatively simple mechanism which includes a master gear, and two master racks, which are controlled by an adjustable pivot arm, whereby the desired ratio of linear to circular motion is obtained, to produce an involute form of any pitch and pressure angle for any generated spur or helix gear.

Another object of the invention is to provide a device which will function in the manner indicated, and for the purpose of generating gears of different size and contour, without the necessity of dis-assembling the important working parts, thereby protecting the parts against the introduction of deleterious foreign matter, and insuring continued accuracy of operation.

Another object of the invention is to provide a means for generating gears, which is simple in construction, economical to manufacture, and efficient in operation.

Another object of the invention is to provide a mechanism which may readily be adapted to milling, grinding, lapping and checking equipment.

Another object of the invention is to provide a fixture which will generate a true involute shape on a gear using a grinding wheel dressed to the desired pressure angle.

Another object of the invention is to provide a means for generating gears, which greatly reduces set up time, and obviates the necessity of using a great assortment of elements common in presently known devices used to generate and form grind gears.

The practice of this invention results in many other advantages, some of which are as follows:

The producing of a more accurate form and finish than is possible with other methods common to the industry today;

Set up time is reduced to a minimum because it is necessary to use but one block, which is used to determine the distance between the center line of pivot and center line of the master gear;

It eliminates approximately 80% of normal calculations required in presently known methods;

It eliminates the necessity of using form dressers;

It eliminates the additional cost and complicated use of numerous master gears, cams, lead screws, nuts, etc.;

It obviates the necessity of using special diamonds with specific radii and concentricity;

It eliminates sine bar methods which are exposed to the elements and often time introduce foreign matter which adversely effect accurate operation;

It permits the sealing in and lubricating for life the delicate working mechanisms;

It reduces the set up time from hours or days to a matter of a few minutes;

The device may be set up or operated by skilled or unskilled labor;

It enables the changing from straight spur grinding, milling or checking, to any helical form, and vise versa in a matter of minutes, thereby eliminating the use of numerous single machines;

The mechanism may be constructed as a fixture to be used in conjunction with available equipment, such as a surface grinder or milling machine, or it may be utilized as a complete and separate floor model machine.

Although I have herein disclosed the mechanism as being equipped for manual operation, it will be understood that it may be automatically operated for actuating or indexing operations, all of which may be controlled hydraulically, electrically or pneumatically.

The foregoing and other objects and advantages of the invention will become more apparent as the description proceeds, reference being made from time to time to the accompanying drawing forming part of the within disclosure, in which drawing.

Figure 1:
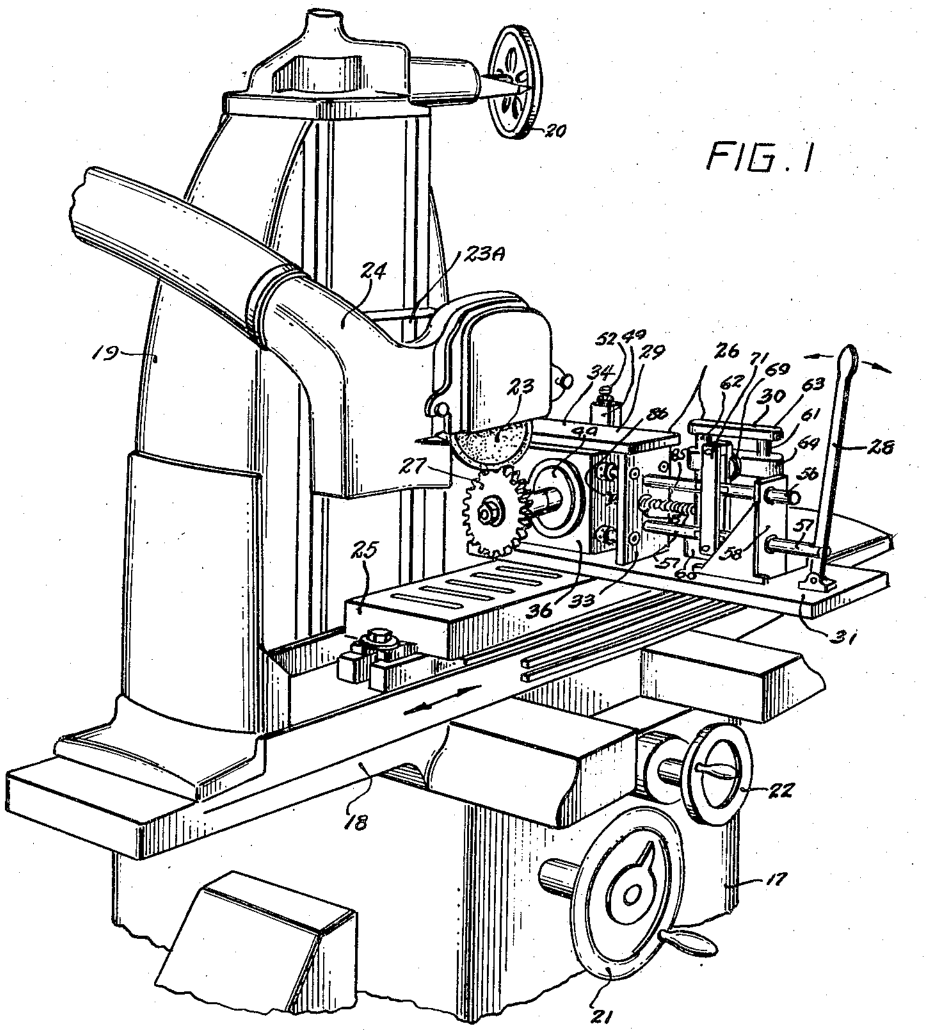
Fig. 1 is a perspective view of the device embodying the invention mounted for use on a conventional surface grinder, having a magnetic chuck.

Referring now more particularly to the drawing, it will be understood that in the embodiment herein disclosed (Fig. 1), the device embodying the invention is shown mounted on a conventional surface grinding machine which comprises a base 17, table 18, column 19, adjusting wheels 20, 21 and 22, a grinding wheel 23, dust collector 24, and a magnetic chuck 25, etc., all of which are conventional elements and form no part of the invention except as they may be used in combination with the fixture 26, which I will now describe.

The fixture 26 (Fig. 1) is shown mounted in position on the magnetic chuck 25, so that the center line of the work piece 27 is lined up with the center line of the pre-dressed grinding wheel 23, and so that the horizontal travel of the grinding machine table 18 passes the wheel 23 between the teeth of the gear 27 as the gear 27 is indexed as hereinafter disclosed. The movement of the hand lever 28 rolls the gear 27 under the grinding wheel 23 in much the same manner as if the gear 23 were running on a rack, whereby to generate a true involute on each tooth as it is brought into contact with the wheel 23. Excess movement of the hand lever 28 merely rolls the gear 27 out of engagement with the wheel 23, allowing room to index for the next tooth.

The fixture 26, in general, consists of two major portions which I will describe as the indexing and work holding portion 29, and the differential stroke adjusting mechanism 30 which, working together, produce the desired results as hereinafter described.

*Indexing and work holding portion*

Figure 2:
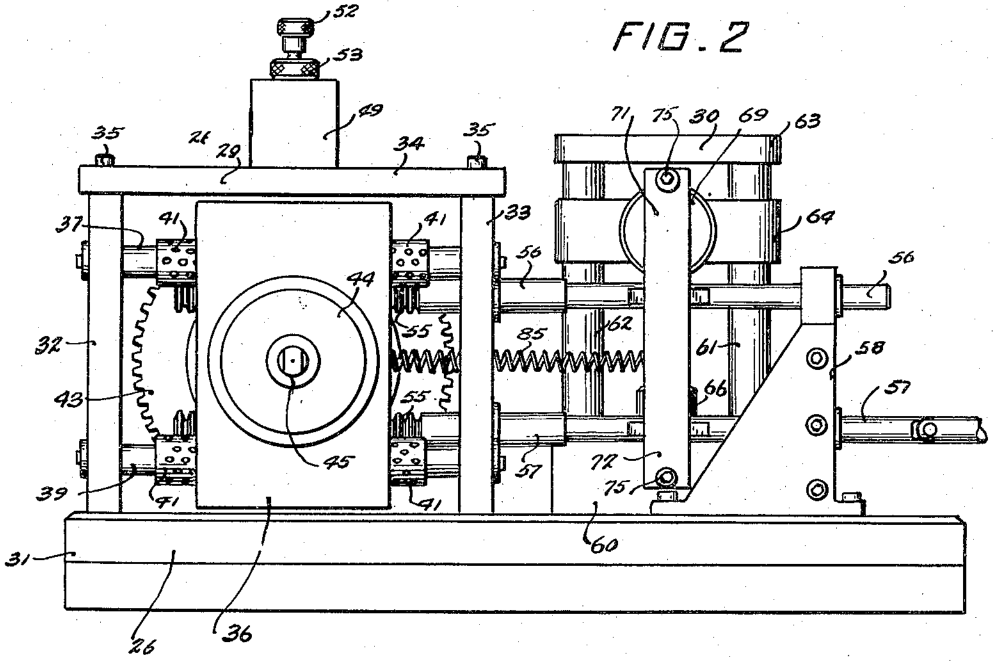
Fig. 2 is an enlarged front elevational view, with parts broken away, of the device embodying the invention shown in Fig. 1.
Figures 4, 5:
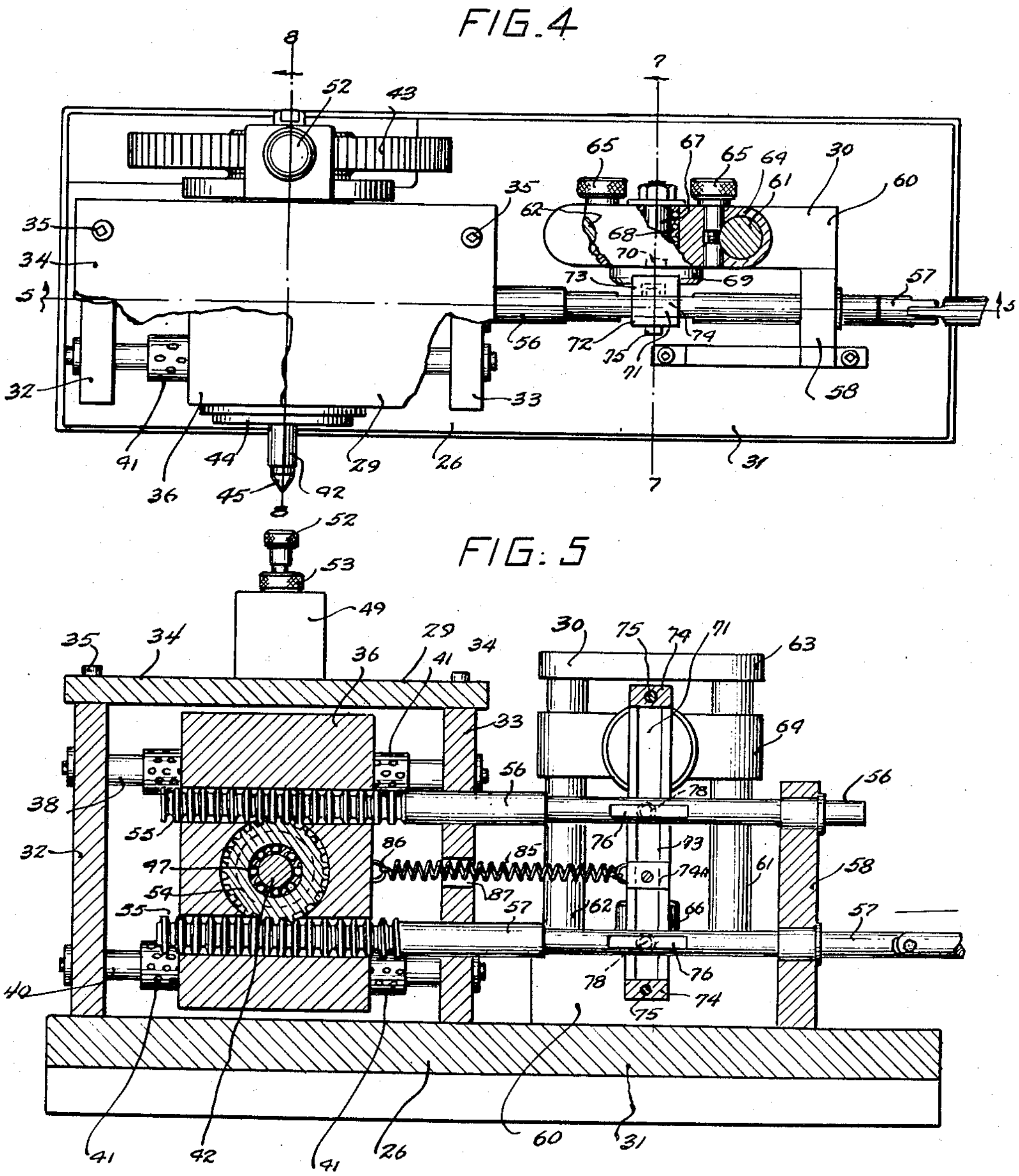
Fig. 4 is a top plan view of the device shown in Fig. 2.
Fig. 5 is a section taken substantially on the line 5—5 of Fig. 4.
Figure 6:
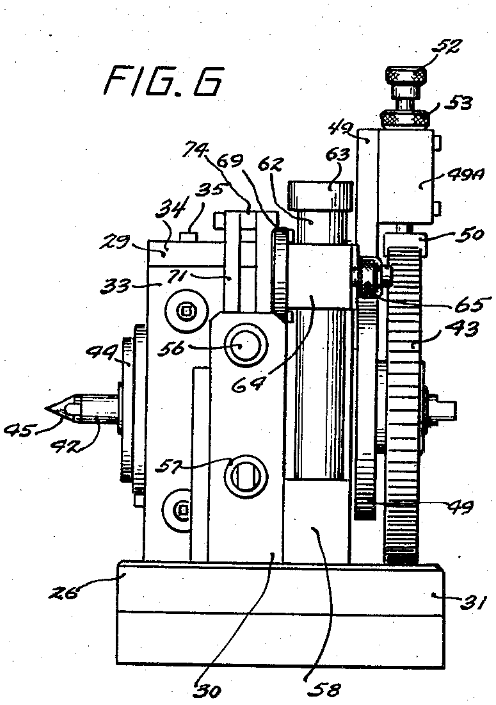
Fig. 6 is an end view.
Figure 7:
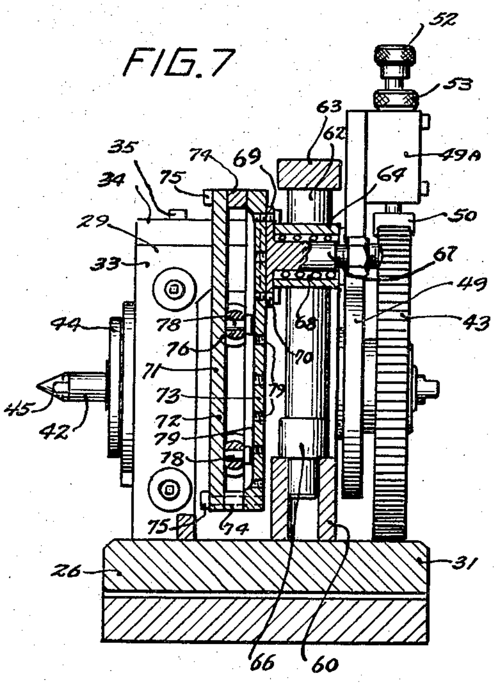
Fig. 7 is a section taken substantially on the line 7—7 of Fig. 4, and illustrating the construction of the differential stroke adjusting mechanism.
Figure 8:
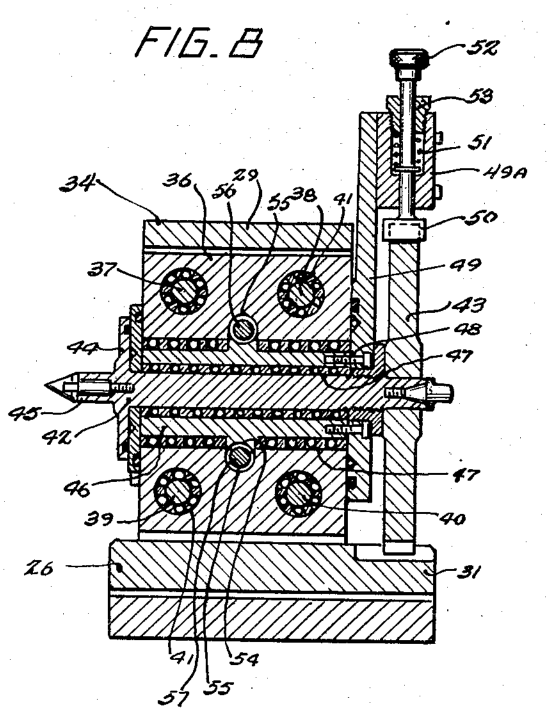
Fig. 8 is a section taken substantially on the line 8—8 of Fig. 4, and showing the construction of the indexing mechanism.

The indexing and work holding portion 29 consists of two vertical end plates 32 and 33, which are rigidly tied together by means of a top plate 34, which is secured to the end plates 32 and 33 by machine screws or other suitable means 35. A substantially rectangular block 36 is mounted for lateral movement between the plates 32 and 33, on four guide bars 37, 38, 39 and 40. Each of said guide bars 37, 38, 39, and 40 is provided with a linear ball bearing 41 to reduce friction between the parts to a minimum and to provide great sensitivity. A work carrying spindle 42 (Fig. 8) which carries at one end an index plate 43 and at the other end a face plate 44, and a work holding arbor 45, is mounted for rotation within a driving spindle 46, which in turn is mounted in the block 36 at right angles to the guide bars 37, 38, 39, and 40. Pre-stressed ball bearing bushings 47 are interposed between the spindles 42 and 46, and between the drive spindle 46 and the block 36. Secured to the driving spindle 46, as at 48, is an index locating pawl arm 49, which has a locating pawl 50 slidably mounted in an extension 49A, which pawl 50 is arranged to engage the notches in the index plate 43, thereby, radially adjustably, locking the two spindles 42 and 46 together. The pawl 50 is spring loaded, as at 51, and is provided with a knurled knob 52, whereby it may be lifted out of engagement with the notches in the wheel 43. The spring 51 is retained by means of a threaded bushing 53. A spindle driving gear 54 (Fig. 8) is formed on the central portion of the outer periphery of the driving spindle 46 and is arranged to mate with racks 55 cut on the ends of two driving bars 56 and 57 (Figs. 2, 5, and 8), which extend through suitable bores formed in the block 36 parallel with the guide rods 37, 38, 39, and 40. The gear 54 may be considered the master gear and the racks 55 may be considered the master racks in this disclosure. The rack 55 on the drive bar 56 is adapted to engage the top of the spindle driving gear 54, and the rack 55 on the drive bar 57 is arranged to engage the bottom of the spindle driving gear 54. The two driving bars 56 and 57 connect the principal parts 29 and 30 in working engagement as disclosed hereinafter. The bars 56 and 57 are slidably supported at their opposite ends by a braced out board bearing member 58, and the drive bars 56 and 57 are reciprocated by the lever 28.

*Differential stroke adjusting mechanism*

Figure 3:
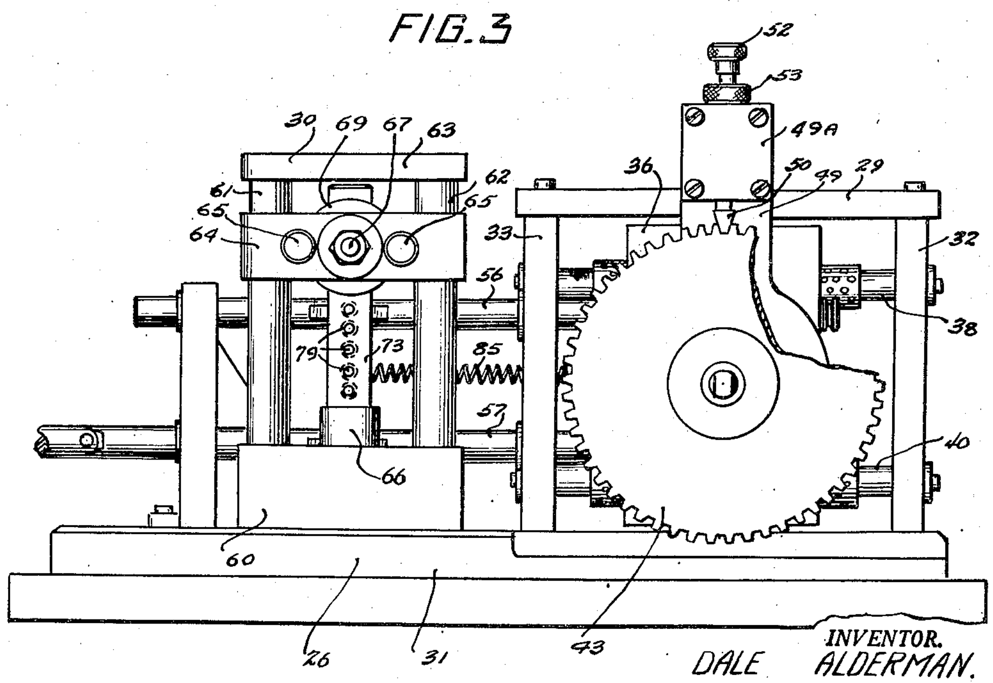
Fig. 3 is an enlarged rear view, with parts broken away, of the device embodying the invention shown in Fig. 1, and illustrating the indexing and differential stroke adjusting mechanism.
Figure 9:
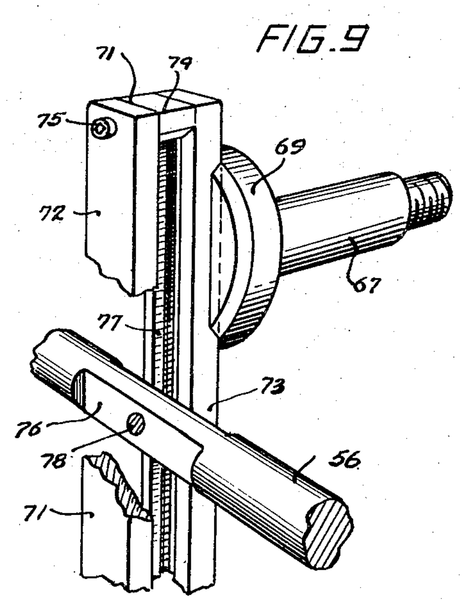
Fig. 9 is an enlarged fragmentary view, in perspective, with parts broken away, showing the construction of the differential stroke adjusting lever and one of the rack rods.

This mechanism consists of a base block 60 (Figs. 2 and 5) which rests on the base 31 and which supports two vertical guide bars 61 and 62, which are joined at their tops by a reinforcing plate 63. The sliding cross bar 64, which is adapted for vertical adjustment, is carried on the vertical guide bars 61 and 62. Locking screws 65 (Figs. 3 and 4) are provided for locking the cross bar 64 in any vertical position on the bars 61 and 62. A rest block 66 is carried on the base 60, midway between the guide bars 61 and 62, and serves as a rest for the use of guage blocks (not shown) for positioning the cross bar 64. This is an important feature of the invention, as it enables rapid set up to be made when work is to be done on a different size gear. Journaled in the center of the cross bar 64 (Figs. 3, 4, 7, and 9) is an axle 67, which is mounted in a ball bearing 68 and which carries a slotted face plate 69 which is bolted, as at 70, to the rear of a fabricated lever or pivot bar 71 (Fig. 9), which lever or pivot bar 71 consists of of a front bar 72, a rear bar 73, and spacers 74, which are secured together by bolts 75. The spaced bars 72 and 73 of the lever or pivot bar 71 straddle a flat portion formed on each of the drive bars 56 and 57. The rear bar 73 is slotted, as at 77 (Fig. 9), whereby to receive the head of a drive pin 78 which extends through a suitable bore formed in the flat portion 76 of each of the drive bars 56 and 57, thereby connecting the two drive bars 56 and 57 in moveable relation to each other through the lever or pivot bar 71.

Additional sets of tapped holes 79 (Fig. 3) are formed in the rear bar 73 of the lever or pivot bar 71 to provide additional differential adjustment positions, whereby the face plate 69 and the axle 67, and the cross bar 64, may be secured at different positions on the lever or pivot bar 71, thereby effecting different adjustments for the pivot 67.

In order to prevent back lash in the master gear 54, and the racks 55, I provide a tension spring 85, one end of which is secured to the block 36, as at 86, and the other end of which is secured to one of the spacers 74A (Fig. 5) comprising an element of the lever or pivot bar 71. The spring 85 passes through a bore 87, formed in the end plate 33.

*Operation*

Figure 13:
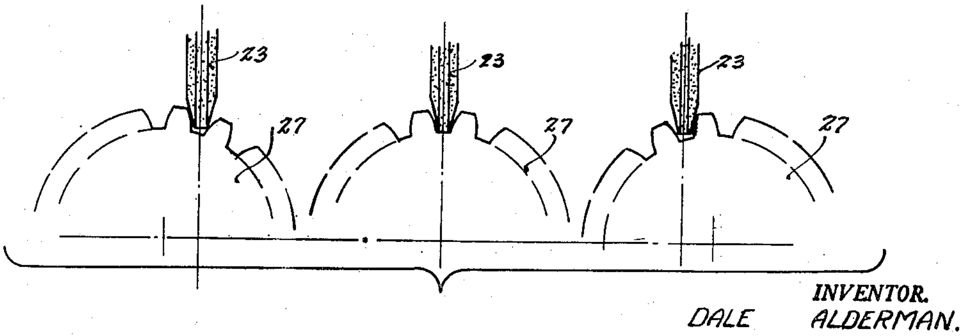
Fig. 13 is a diagrammatic view showing the movement of the gear as it is rolled under the grinding wheel.

The center lines of the gear 27 and grinding wheel 23 are first squared up. They are located at 90° for a straight spur gear and at the spiral angle of the gear for a spiral gear. The pitch diameter of the gear 27 is obtained by adjusting the grinding wheel slide 23A up or down, and the tooth thickness at the pitch line is adjusted by the "in and out" adjustment of the grinding machine table 18. The wheel 23 grinds the inside faces of two adjacent teeth at one stroke, as shown in Fig. 13.

The grinding machine table feed is adjusted to suit the width of the gear 27 being ground, and the machine is started up. Rocking movement of the manual operating handle 28 rolls the gear 27 under the grinding wheel 23 and thereby generates a true or modified involute tooth form on the face of each adjoining tooth (Fig. 13).

Figures 10, 11, 12:
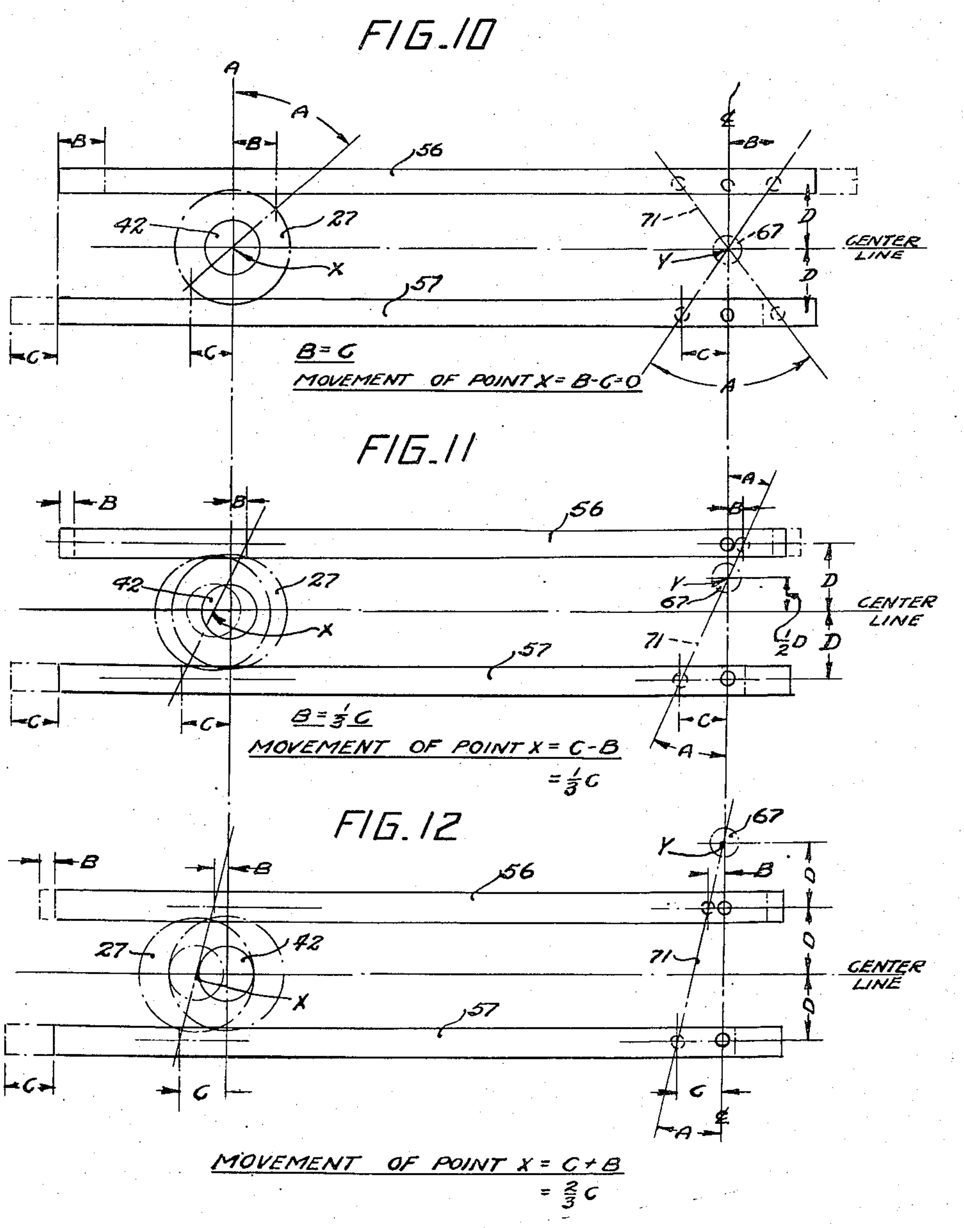
Fig. 10 is a diagrammatic lay-out illustrating the differential stroke mechanism adjusted for the minimum stroke (zero).
Fig. 11 is a diagrammatic lay-out illustrating the differential stroke mechanism adjusted for an intermediate stroke.
Fig. 12 is a diagrammatic lay-out illustrating the differential stroke mechanism adjusted for a longer stroke.

It is necessary to both roll the gear 27 and move it sideways under the wheel 23 at the same time. This action must duplicate exactly the rolling of a gear in a rack. In order to accomplish this action, the movement of the top drive rack 55—56 in relation to the lower drive rack 55—57 is controlled by the position of the fabricated lever or pivot bar 71 on the axle 67 (Figs. 10 and 12). If the center of the axle 67 is on the center line between the two drive racks 56 and 57 (Fig. 10) only a turning motion of the work holding spindle 42 and gear 27 will result from the movement of the drive bars 56 and 57. If the axle 67 is located below the upper drive bar 56, but above the center line, as shown in Fig. 11, the length of the side movement of the work holding spindle 42 and gear 27 will equal the difference between the movement of the two bars 56 and 57. If the axle 67 is located above the upper drive bar 56, as shown in Fig. 12, the length of the side movement of the work holding spindle 42 and gear 27 will be the sum of the movement of the two drive bars 56 and 57. The equations accompanying each of the Figs. 10, 11, and 12, further illustrate the problem.

Thus, the sidewise or linear movement and the turning or rotary movement of the gear 27 can be combined to create a true rolling movement, the length of which corresponds with the rolling movement of a gear of any size, within the range of the fixture, which in this instance covers gears ranging from three inches to eight inches in diameter.

In Fig. 13 I diagrammatically illustrate the gear 27 in three positions shown during the generating movement of the gear. One of the positions shows (at the left) the gear as it is rolled to the left of the center line of the grinding wheel. The center view (Fig. 13) shows the gear with its center on the center line of the grinding wheel and the view to the right of Fig. 13 shows the gear rolled to the right of the center line of the grinding wheel.

In Fig. 13 it will be seen that the grinding faces of the wheel 23 are always tangent to the involute curves on the teeth being simultaneously ground as the rolling movement of the gear takes place.

Having described my invention, what I claim and desire to secure by Letters Patent is:

1. In a device of the character described in combination, a spindle for holding a work piece, a drive spindle, indexing means co-operatively connecting said spindles, means for supporting said drive spindle, a master gear on said drive spindle, a pair of spaced, parallel, slidable racks on opposite sides of and in engagement with said gear, a pivot arm, means to support said arm, and means for pivotally connecting said pivot arm to said racks.

2. The structure of claim 1, including means for adjustably supporting the pivot point of said pivot arm with respect to the center line of said spindles, whereby the ratio of the linear motion of said racks with respect to the circular motion of said gear may be varied.

3. The structure of claim 1, in which said indexing means include an indexing wheel on said first named spindle, with adjustable means associated therewith for locking said indexing wheel to said drive spindle.

4. The structure of claim 1, in which said racks engage opposite peripheral portions of said gear, and the pivot point of said arm is adjustable with respect to the center of said gear, whereby the linear motion of said racks with respect to each other may be varied.

5. The structure of claim 1, in which said drive spindle supporting means, include a laterally moveable block, and a spring extending from said block to said pivot arm.

6. The structure of claim 1, in which said indexing means include an indexing wheel on said first named spindle, and an adjustable pawl arm secured to said drive spindle, with means for intermittently engaging said pawl arm with said indexing wheel.

7. In a device of the character described in combination, a laterally slideable block, guides for said block, a work holding spindle rotatable in an opening in said block, a drive spindle concentric with said work holding spindle, a master gear supported by and rotatable with said drive spindle, a pair of spaced drive rods slideable in and extending from said block and having racks formed thereon in engagement with said master gear, a pivot arm, means to support said pivot arm, said arm being pivotally secured to said drive rods, and means to swing said pivot arm.

8. The structure of claim 7, in which said pivot arm supporting means include a vertically adjustable block with means for locking said block in different positions of adjustment, and pivot means on said last named block for supporting said pivot arm.

9. The structure of claim 7, including a spring extending between said laterally slideable block and said pivot arm.

10. The structure of claim 7, including an indexing wheel on said work holding spindle, and a pawl arm secured to said drive spindle with means for intermittently locking said indexing wheel and said pawl arm together.

References Cited in the file of this patent

UNITED STATES PATENTS

| | | |
|---|---|---|
| 1,135,780 | Drummond et al. | Apr. 13, 1915 |
| 2,176,924 | Olson | Oct. 24, 1939 |
| 2,257,850 | Miller | Oct. 7, 1941 |